(12) United States Patent
Choi et al.

(10) Patent No.: US 12,294,117 B2
(45) Date of Patent: May 6, 2025

(54) BATTERY MODULE, METHOD FOR MANUFACTURING THE SAME, AND BATTERY PACK

(71) Applicant: LG Energy Solution, Ltd., Seoul (KR)

(72) Inventors: Jonghwa Choi, Daejeon (KR); Junyeob Seong, Daejeon (KR); Myungki Park, Daejeon (KR); Junkyu Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 817 days.

(21) Appl. No.: 17/433,908

(22) PCT Filed: Apr. 20, 2020

(86) PCT No.: PCT/KR2020/005201
§ 371 (c)(1),
(2) Date: Aug. 25, 2021

(87) PCT Pub. No.: WO2020/251159
PCT Pub. Date: Dec. 17, 2020

(65) Prior Publication Data
US 2022/0140447 A1 May 5, 2022

(30) Foreign Application Priority Data
Jun. 12, 2019 (KR) .................. 10-2019-0069229

(51) Int. Cl.
*H01M 10/647* (2014.01)
*H01M 10/653* (2014.01)
(Continued)

(52) U.S. Cl.
CPC ....... *H01M 50/507* (2021.01); *H01M 10/647* (2015.04); *H01M 10/653* (2015.04);
(Continued)

(58) Field of Classification Search
CPC ............. H01M 50/507; H01M 10/647; H01M 10/653; H01M 50/211; H01M 50/249;
(Continued)

(56) References Cited

U.S. PATENT DOCUMENTS 8,785,018 B2   7/2014   Nam et al.
9,153,799 B2   10/2015  Kim et al.
(Continued)

FOREIGN PATENT DOCUMENTS

CN    103180998 A    6/2013
CN    105470421 A    4/2016
(Continued)

OTHER PUBLICATIONS

Intrnational Search Report for PCT/KR2020/005201 mailed Jul. 29, 2020; 3 pages.
(Continued)

*Primary Examiner* — Muhammad S Siddiquee
(74) *Attorney, Agent, or Firm* — Lerner David LLP (57) ABSTRACT

A battery module includes: a battery cell stack in which a plurality of battery cells are stacked, a first L-shaped frame accommodating the battery cell stack; and defining an open upper part and one open side surface, and a second L-shaped frame accommodating the battery cell stack, defining an open lower part and an one open side surface, wherein the first L-shaped frame and the second L-shaped frame are engaged with each other to surround four surfaces of the battery cell stack, a lower surface of the first L-shaped frame includes a first part and a second part, the first part is located at a first end with respect to a length direction of the battery cell, the second part is located between the first part and a second end opposite the first end, and a thickness of the first part is smaller than the thickness of the second part.

9 Claims, 10 Drawing Sheets

(51) Int. Cl.
  *H01M 50/211* (2021.01)
  *H01M 50/249* (2021.01)
  *H01M 50/507* (2021.01)

(52) U.S. Cl.
  CPC ....... *H01M 50/211* (2021.01); *H01M 50/249* (2021.01); *H01M 2220/20* (2013.01)

(58) Field of Classification Search
  CPC ........... H01M 2220/20; H01M 10/613; H01M 10/625; H01M 50/244; H01M 50/271; H01M 50/20; H01M 10/655; Y02E 60/10
  See application file for complete search history.

(56) References Cited

U.S. PATENT DOCUMENTS

| | | | |
|---|---|---|---|
| 9,306,194 B2 | 4/2016 | Kim et al. | |
| 9,865,845 B2 | 1/2018 | Kim et al. | |
| 9,882,178 B2 | 1/2018 | Kim et al. | |
| 10,141,546 B2 | 11/2018 | Kim et al. | |
| 2013/0224541 A1 | 8/2013 | Nam et al. | |
| 2014/0093770 A1 | 4/2014 | Choo et al. | |
| 2016/0093847 A1 | 3/2016 | Gunther et al. | |
| 2016/0268564 A1 | 9/2016 | Cho et al. | |
| 2017/0025719 A1 | 1/2017 | Yamada et al. | |
| 2018/0277803 A1 | 9/2018 | Park et al. | |
| 2019/0131596 A1* | 5/2019 | Yang | H01M 50/224 |
| 2019/0198952 A1 | 6/2019 | Choi et al. | |
| 2019/0229313 A1 | 7/2019 | Lee et al. | |
| 2019/0305268 A1 | 10/2019 | Ryu et al. | |
| 2020/0036049 A1* | 1/2020 | Lee | H01M 50/211 |
| 2022/0158272 A1 | 5/2022 | Ju et al. | |

FOREIGN PATENT DOCUMENTS

| | | |
|---|---|---|
| CN | 108475742 A | 8/2018 |
| CN | 109478618 A | 3/2019 |
| CN | 109643768 A | 4/2019 |
| CN | 109863618 A | 6/2019 |
| EP | 3340339 A2 | 6/2018 |
| JP | 4947893 B2 | 6/2012 |
| JP | 2012160347 A | 8/2012 |
| JP | 2013175425 A | 9/2013 |
| JP | 2013229266 A | 11/2013 |
| KR | 101520902 B1 | 5/2015 |
| KR | 20160109423 A | 9/2016 |
| KR | 20170141402 A | 12/2017 |
| KR | 20180018113 A | 2/2018 |
| KR | 20190012803 A | 2/2019 |
| KR | 20190012979 A | 2/2019 |
| KR | 20190078521 A | 7/2019 |
| WO | 2015151884 A1 | 10/2015 |
| WO | 2018022907 A1 | 2/2018 |
| WO | 2019022407 A1 | 1/2019 |
| WO | 2019088625 A1 | 5/2019 |

OTHER PUBLICATIONS

Search Report dated Dec. 6, 2022 from the Office Action for Chinese Application No. 202080027105.X issued Dec. 21, 2022, pp. 1-3.

Extended European Search Report and European Search Opinion for European Patent No. 20822687.8 dated Feb. 14, 2022, 9 pgs.

* cited by examiner

[FIG. 1]

[PRIOR ART]

BATTERY MODULE, METHOD FOR MANUFACTURING THE SAME, AND BATTERY PACK

CROSS REFERENCE TO RELATED APPLICATIONS

This application is a national phase entry under 35 U.S.C. § 371 of PCT/KR2020/005201 and claims the benefit of Korean Patent Application No. 10-2019-0069229 filed on Jun. 12, 2019 with the Korean Intellectual Property Office, the disclosures of which are each incorporated herein by reference in their entirety.

TECHNICAL FIELD

The present disclosure relates to a battery module, a method for manufacturing the same and a battery pack, and more particularly to a battery module that improves space utilization rate and minimizes damage to parts, a method for manufacturing the same, and a battery pack.

BACKGROUND ART

Secondary batteries, which are easily applied to various product groups and has electrical characteristics such as high energy density, are universally applied not only for a portable device but also for an electric vehicle (EV) or a hybrid electric vehicle (HEV), an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Preferably, the middle- or large-sized battery module is manufactured so as to have as small a size and weight as possible. Consequently, a prismatic battery or a pouch-shaped battery, which can be stacked with high integration and has a small weight to capacity ratio, is usually used as a battery cell of the middle- or large-sized battery module. Meanwhile, in order to protect the cell stack from external shock, heat, or vibration, the battery module may include a frame member whose front and back surfaces are opened so as to accommodate the battery cell stack in an internal space.

Figure 1:
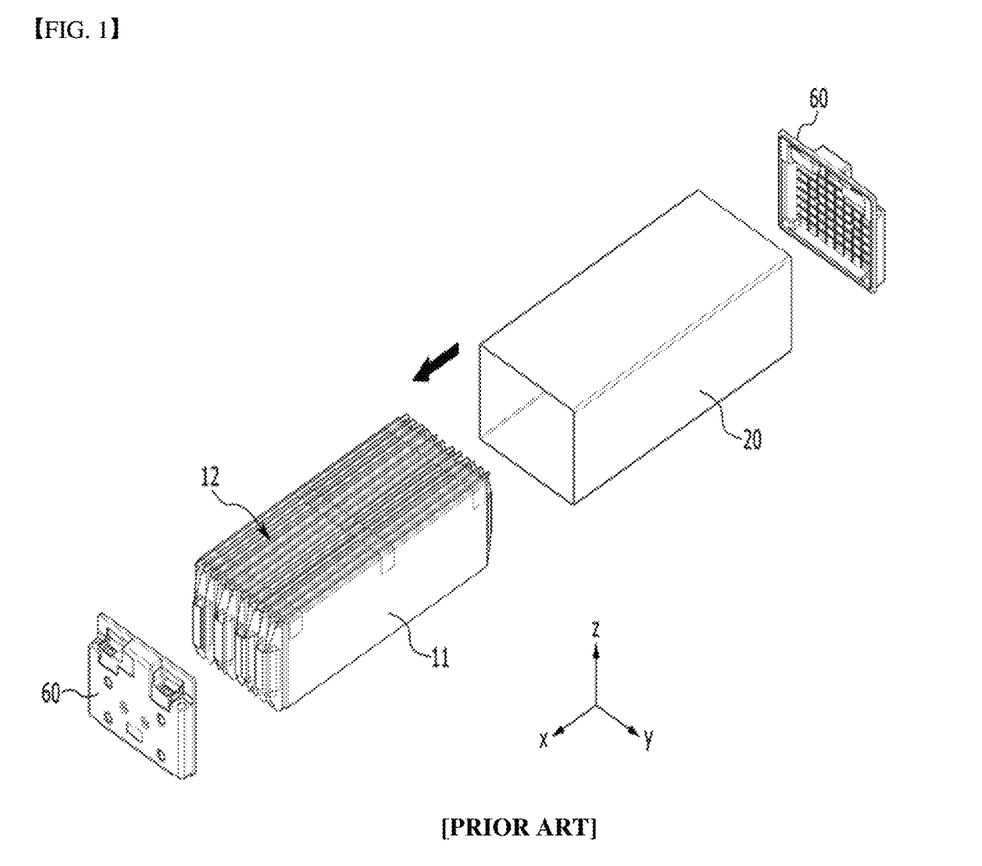
FIG. 1 is an exploded perspective view illustrating a battery module having a mono frame according to the related art.

FIG. 1 is a perspective view illustrating a battery module having a mono frame according to the related art Referring to FIG. 1, the battery module may include a battery cell stack 12 formed by stacking a plurality of battery cells 11, a mono frame 20 whose front and back surfaces are opened so as to cover the battery cell stack 12, and an end plate 60 covering the front and back surfaces of the mono frame 20. In order to form such a battery module, it is necessary for the battery module to be horizontally assembled such that the battery cell stack 12 is inserted into opened front surface or back surface of the mono frame 20 along the X-axis direction as shown by an arrow in FIG. 1. However, a sufficient clearance has to be secured between the battery cell stack 20 and the mono frame 20 such that the battery module is stably assembled horizontally. Here, the clearance means a gap caused by fitting or the like. If the clearance is small, parts may be damaged in a process of horizontally assembling the battery module. Therefore, in consideration of the maximum height of the battery cell stack 12 and the assembly tolerance in the insertion process, the height of the mono frame 20 has to be designed to be large and thus, unnecessarily wasted space may be caused.

DETAILED DESCRIPTION OF THE INVENTION

Technical Problem

The present disclosure has been made to solve the above-mentioned problems, and an object of the present disclosure is to provide a battery module that improves space utilization rate and minimizes damage to parts by modifying a structure of a frame member that covers the battery cell stack, a method of manufacturing the same and a battery pack.

However, the problem to be solved by embodiments of the present disclosure is not limited to the above-described problems, and can be variously expanded within the scope of the technical idea included in the present disclosure.

Technical Solution

A battery module according to one embodiment of the present disclosure includes: a battery cell stack in which a plurality of battery cells are stacked, a first L-shaped frame accommodating the battery cell stack and defining an open upper part and one open side surface, and a second L-shaped frame accommodating the battery cell stack and defining an open lower part and one open side surface, wherein the first L-shaped frame and the second L-shaped frame are engaged with each other to surround four surfaces of the battery cell stack, a lower surface of the first L-shaped frame includes a first part and a second part, the first part is located at a first end with respect to a length direction of the battery cell, the second part is located between the first end and a second end opposite the first end, and a thickness of the first part is smaller than the thickness of the second part.

The battery module may further include a busbar frame that is connected to the battery cell stack, the first L-shaped frame is opened at both ends facing each other with respect to the length direction, the busbar frame is connected to the battery cell stack on both of the open ends of the first L-shaped frame, and the busbar frame may include a main frame disposed perpendicular to the length direction, and a bending part extending from a lower part of the main frame.

The bending part may be located on the first part of the bottom part of the first L-shaped frame.

The total thickness of the thickness of the bending part and the thickness of the first part may be smaller than that of the second part.

The battery cell may include a protrusion part formed in a width direction thereof, and the protrusion part may be located on the bending part.

The battery module may further include a pad part that is located between the second part and the battery cell stack in a height direction of the battery cell.

The battery module may further include a thermally conductive resin layer located between the second part and the battery cell stack in the height direction, and the pad part is located between the thermally conductive resin layer and the first part in the length direction.

The lower surface of the battery cell stack that is perpendicular to a stacking direction of the plurality of the battery cell may be mounted on the lower surface of the first L-shaped frame.

The battery module may further include an end plate coupled to each of the first and second ends of the first L-shaped frame.

A battery pack according to another embodiment of the present disclosure includes the above-mentioned battery module.

A method of manufacturing a battery module according to another embodiment of the present disclosure includes: mounting a battery cell stack on a lower surface of a first L-shaped frame, of which an upper part and one side surface are opened, covering the battery cell stack with a second L-shaped frame so as to cover open surfaces of the battery cell stack not covered with the first L-shaped frame, coupling the first L-shaped frame and the second L-shaped frame, and coupling an end plates on each opened end of the battery cell stack not surrounded by the first L-shaped frame and the second L-shaped frame, wherein the battery cell stack is mounted on the lower surface of the first L-shaped frame while moving along a direction that is perpendicular to the lower surface of the first L-shaped frame.

The method for manufacturing the battery module may further include connecting the battery cell stack and the busbar frame while moving the busbar frame toward an opposite direction to a direction in which an electrode lead of a battery cell included in the battery cell stack protrudes before mounting the battery cell stack on the lower surface of the first L-shaped frame.

The method for manufacturing the battery module may further include applying a thermally conductive resin on the lower surface of the first L-shaped frame before mounting the battery cell stack on the lower surface of the first L-shaped frame.

The method for manufacturing the battery module may further include forming a pad part on the lower surface of the first L-shaped frame before applying the thermally conductive resin, and the pad part may guide an application location of the applied thermally conductive resin.

The battery cell stack may be inserted into the lower surface of the first L-shaped frame in a direction that is perpendicular to a stack direction of a plurality of battery cell included in the battery cell stack.

Advantageous Effects

According to the embodiments, an L-shaped frame may be realized to reduce a tolerance between a battery stack and a frame as compared with the related art, thereby improving space utilization rate.

Further, a protective cover that is necessary for preventing damage during an assembling operation may be removed.

Further, a periphery of a lower surface of the L-shaped frame may be machined to reduce a gap between the battery cell stack and the frame, so that space utilization rate in the height direction may be improved.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 2:
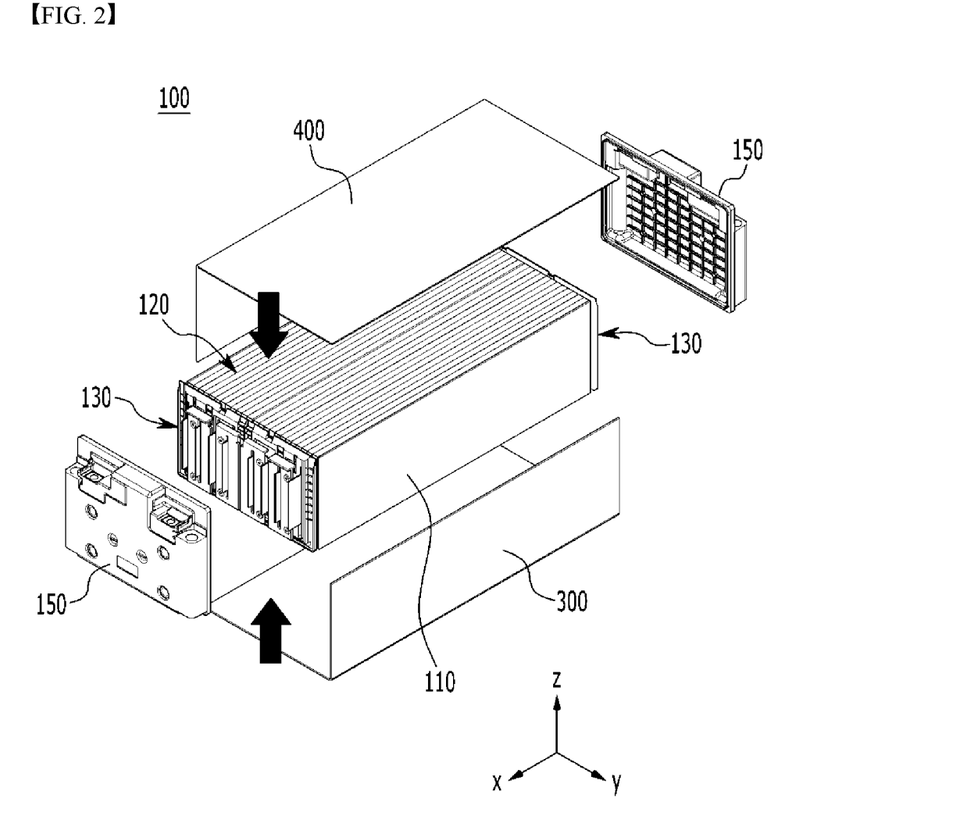
FIG. 2 is an exploded perspective view illustrating a battery module according to an embodiment of the present disclosure.
Figure 3:
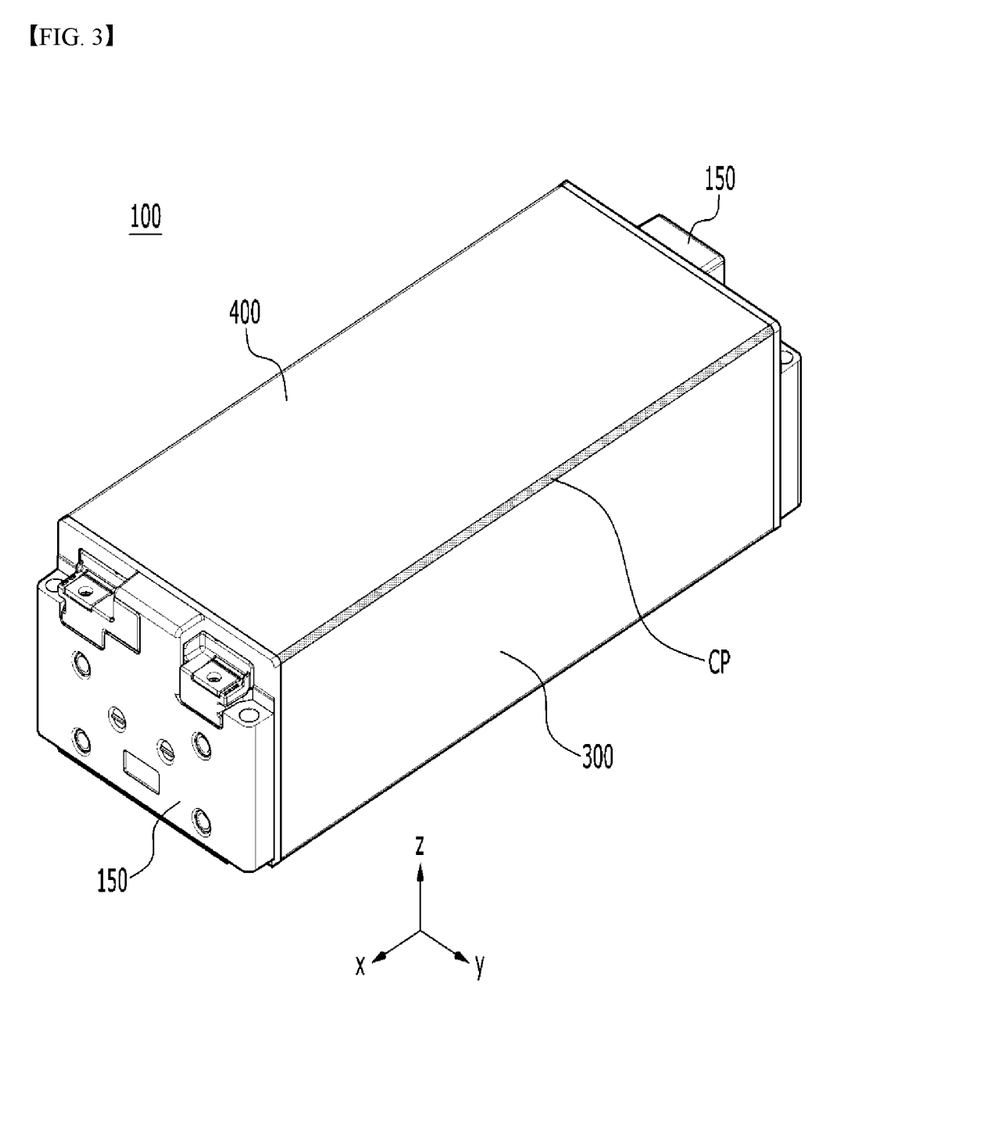
FIG. 3 is a perspective view illustrating a state in which elements of the battery module of FIG. 2 are coupled to each other.
Figure 4:
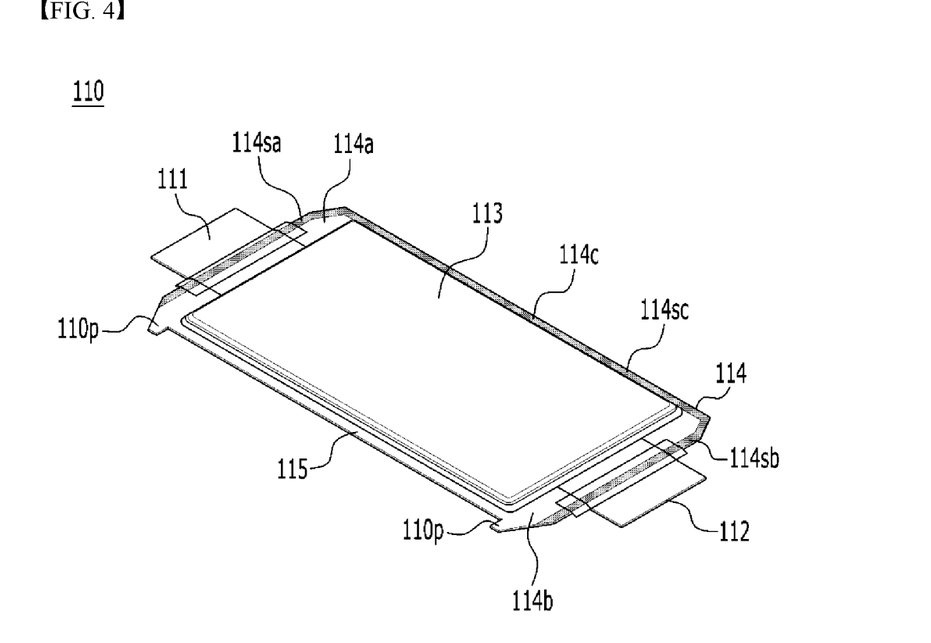
FIG. 4 is a perspective view illustrating one battery cell included in the battery cell stack of FIG. 2.

FIG. 2 is an exploded perspective view illustrating a battery module according to an embodiment of the present disclosure. FIG. 3 is a perspective view illustrating a state in which elements of the battery module of FIG. 2 are coupled to each other. FIG. 4 is a perspective view illustrating one battery cell included in the battery cell stack of FIG. 2.

Referring to FIG. 2, and FIG. 3, a battery module 100 according to the present embodiment includes a battery cell stack 120 including a plurality of battery cell 110, a first L-shaped frame 300, of which an upper surface, a front surface, and a rear surface are opened, a second L-shaped frame 400, of which an lower surface, a front surface, and a rear surface are opened, end plates 150 each located on a front surface and a rear surface of the battery cell stack 120; and a busbar frame located between the battery cell stack 120 and the end plate 150.

When it is assumed that opened both sides of the first L-shaped frame 300 are a first side and a second side, respectively, the L-shaped frame 300 includes a plate-shaped structure bent so as to continuously cover mutually adjacent a lower surface and one side surface among the remaining outer surfaces except surfaces of the battery cell stack 120 corresponding to the first side and the second side. Similarly, when it is assumed that opened both sides of the first L-shaped frame 400 are a first side and a second side, respectively, the L-shaped frame 400 includes a plate-shaped structure bent so as to continuously cover mutually adjacent upper surface and another side surface among the remaining outer surfaces except for surfaces of the battery cell stack 120 corresponding to the first side and the second side.

The first L-shaped frame 300 and the second L-shaped frame 400 are coupled to each other through welding and the like in a state in which corresponding edge parts thereof contact each other to form a structure covering the battery cell stack 120. The first L-shaped frame 300 and the second L-shaped frame 400 are engaged with each other to surround four surfaces of the battery cell stack 120. That is, the first L-shaped frame 300 and the second L-shaped frame 400 may form a coupling part CP formed at the corresponding edge parts thereof through a coupling method such as welding or the like.

The battery cell stack 120 includes a plurality of battery cells 110 stacked in one direction thereof, and the plurality of the battery cells 11 may be stacked in the Y-axis direction as illustrated in FIG. 2. It is preferable that the battery cell 110 is a pouch-shaped battery cell. For example, referring to FIG. 4, the battery cell 110 according to the present embodiment has a structure in which two electrode leads 111 and 112 face each other and protrude from one end part 114a and another one end part 114b of a battery body 113, respectively. The battery cell 110 may be manufactured by bonding both end parts of a battery case 114a and 114b and both side surfaces 114c connecting them. That is, the battery cell 110 according to the present embodiment includes a total of three places of sealing parts 114sa, 114sb, and 114sc, the sealing parts 114sa, 114sb, and 114sc are sealed in a method such as thermal fusion, and a remaining another one side part may have a connecting part 115. A section between the both ends 114a and 114b of the battery case 114 may be defined as a lengthwise direction of the battery cell 110, and a section between one side part 114c and the connecting part 115 connecting the both end parts of the battery case 114 may be defined as a widthwise direction of the battery cell 110.

The connecting part 115 is an area extending long along one periphery of the battery cell 110, and a protrusion part 110p may be formed at an end part of the connecting part 115. The protrusion part 110p may be formed at at least one of both end parts of the connecting part 115, and may protrude in a direction that is perpendicular to a direction in which the connecting part 115 extends. The protrusion 110p may be positioned between one of the sealing portions 114sa and 114sb of both ends 114a and 114b of the battery case 114 and the connection portion 115.

The battery case 114 is generally formed of a stacked structure of a resin layer/metal layer and a thin film layer/a resin layer. For example, when a surface of the battery case is formed of an oriented (O)-nylon layer, a surface of the battery case tends to easily slip due to an external impact when the plurality of battery cell are stacked to form a middle- or large-sized battery module. Accordingly, in order to prevent this and maintain a stable stacked structure of the battery cell, the battery cell stack 120 may be formed by attaching an adhesive member such as a cohesive type adhesive agent of a double-side tape or a chemical adhesive agent coupled due to a chemical reaction when sticking on a surface of the battery case. In the present embodiment, the battery cell stack 120 is stacked in the Y-axis direction, and is accommodated in a first L-shaped frame 300 in the Z-axis direction so that the battery cell stack 120 may be cooled by a thermally conductive resin layer, which will be described below. For a comparative example for the present embodiment, the battery cell is formed of cartridge-shaped components so that the battery cells may be fixed by assembling a frame of the battery module. In the comparative example, a cooling operation may be hardly performed or may progress in a surface direction of the battery cell due to existence of the cartridge-shaped components and may not properly progress in a heightwise direction of the battery module.

Figure 5:
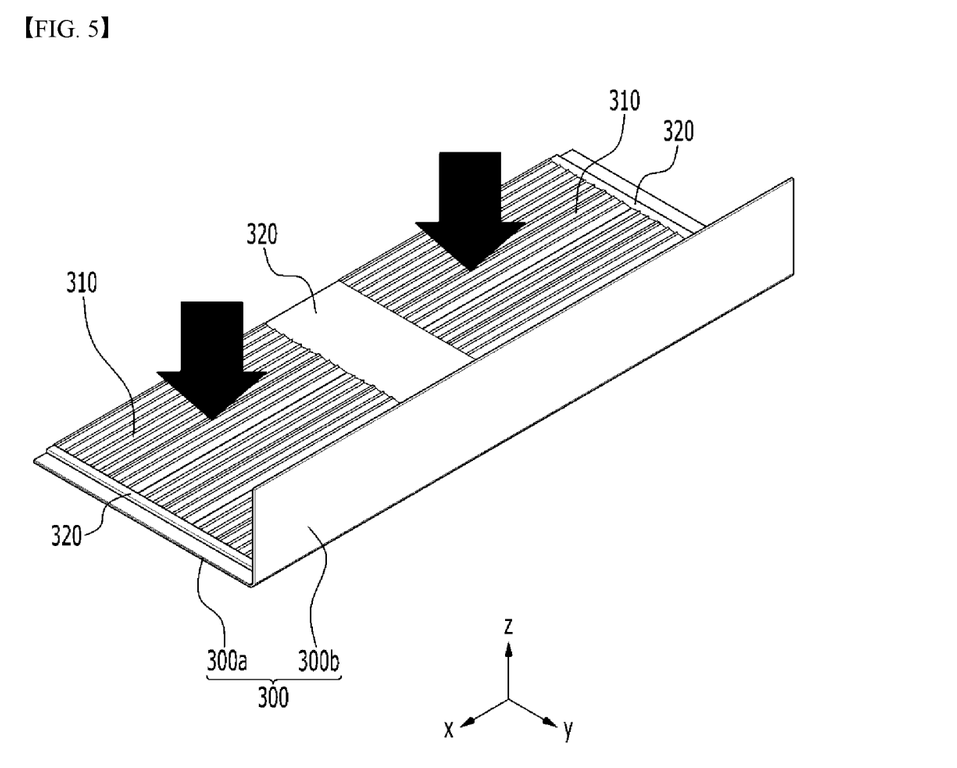
FIG. 5 is a perspective view illustrating a first L-shaped frame in the battery module of FIG. 2.

FIG. 5 is a perspective view illustrating a first L-shaped frame in the battery module of FIG. 2.

Referring to FIG. 5, the first L-shaped frame 300 according to the present embodiment includes a lower surface 300a and a side surface part 300b bent from the lower surface 300a. Before the battery cell stack 120 described in FIG. 2 is mounted on the lower surface 300a of the first L-shaped frame 300, the thermally conductive resin layer 310 may be formed by applying a thermally conductive resin on the lower surface 300a of the first L-shaped frame 300 and curing the thermally conductive resin. Before the thermally conductive resin layer 310 is formed, that is, the applied thermally conductive resin is cured, the battery cell stack 120 may be mounted on the lower surface 300a of the first L-shaped frame 300 while moving along in a direction that is perpendicular to the lower surface 300a of the first L-shaped frame 300. Thereafter, the thermally conductive resin layer 310 that is formed as the thermally conductive resin is cured, is located between the lower surface 300a and the battery cell stack 120. The thermally conductive resin layer 130 may function to transfer heat generated from the battery cell 110 to a bottom of the battery module 100, and fix the battery cell stack 120.

The battery module according to the present embodiment may further include a pad part 320 formed on the lower surface 300a of the first L-shaped frame 300. The pad part 320 may guide an application location of the thermally conductive resin or prevent the thermally conductive resin from overflowing to the outside of the bottom part 300a, and at least one thereof may be formed. FIG. 5 illustrates that one pad part is formed at the center of the lower surface 300a, and each of pad parts is formed at both end parts of the lower surface 300a with respect to the X-axis direction, but the size, the location, the number, and the like may be modified and designed in consideration of an application amount of the thermally conductive resin. The pad part 320 may be formed of an insulation film. Then, the pad part 320 may be formed of a material such as polyurethane (PU) foam or rubber such that the thermally conductive resin may be compressed when the battery cell 110 contacts an upper part of the bottom part 300a.

Referring to FIGS. 2 and 3 again, the distance between a side surface part of the first L-shaped frame 300 and a side surface part of the second L-shaped frame 400 according to the present embodiment may be same as the width of the lower surface of the first L-shaped frame 300 or the width of the upper surface of the second L-shaped frame 400. That is, an edge part along the X-axis direction of the side surface part of the second L-shaped frame 400 and an edge part along the X-axis direction of the side surface part of the first L-shaped frame 300 may directly contact each other to be coupled to each other through a method such as welding and the like.

Figure 6:
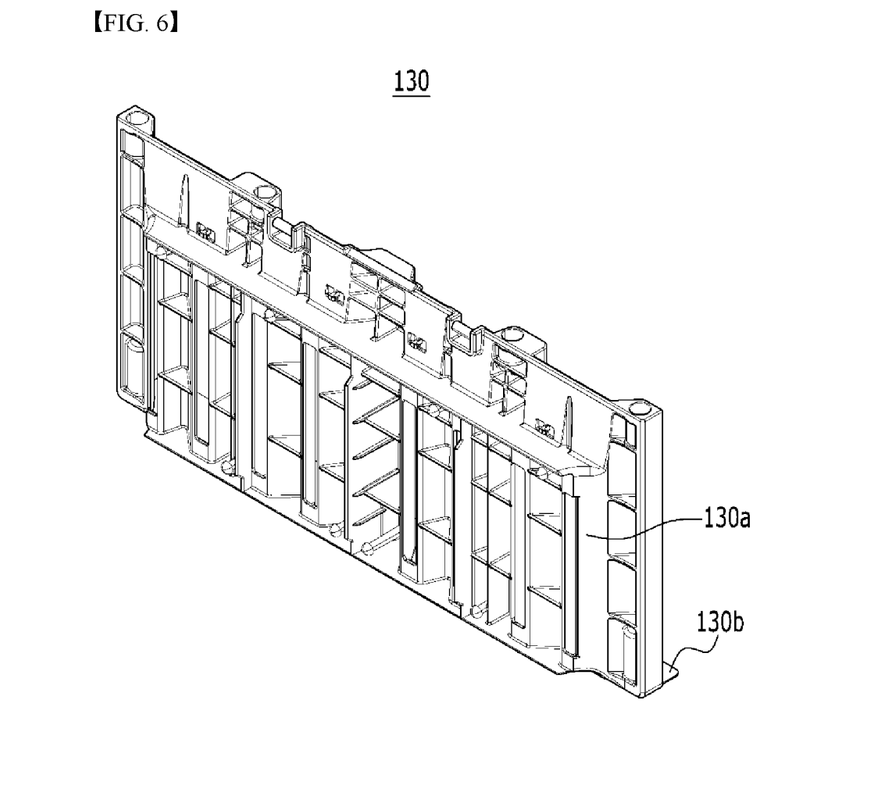
FIG. 6 is a perspective view illustrating a busbar frame in the battery module of FIG. 2.

FIG. 6 is a perspective view illustrating a busbar frame in the battery module of FIG. 2.

Referring to FIG. 6, the busbar frame 130 according to the present embodiment includes a main frame 130a disposed to be perpendicular to a direction in which the electrode leads 111 and 112 described in FIG. 4 protrudes, and a bending part 130b extending from a lower part of the main frame 130a. The busbar frame 130 is connected to the battery cell stack 120 as described in FIGS. 2 and 3. A structure in which the electrode lead passes through a slot to be coupled to the busbar may be formed in the main frame 130a. The bending part 130b may be bent by approximately 90 degrees with respect to the main frame 130a to be located on the lower surface 300a of the first L-shaped frame 300. The bending part 130b and peripheral configurations will be additionally described with reference to FIG. 7.

Figure 7:
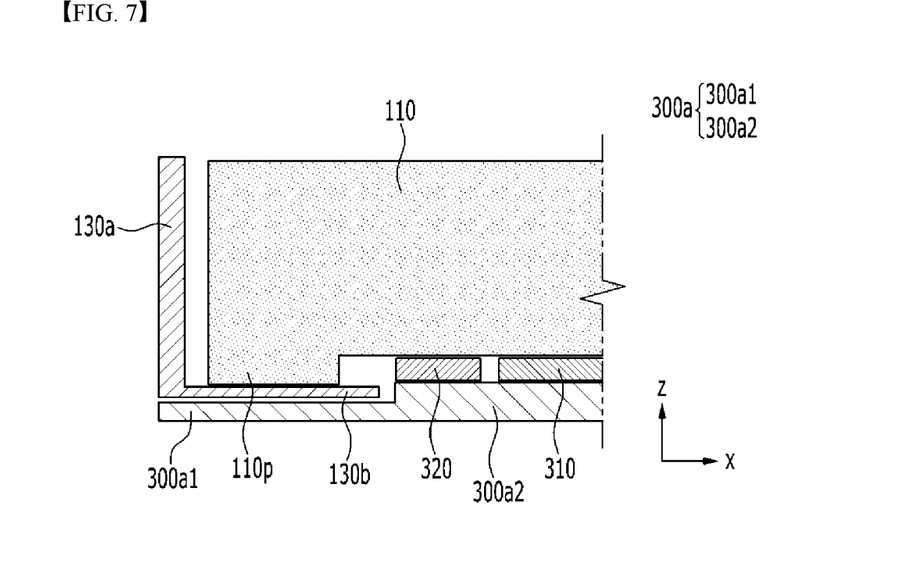
FIG. 7 is a cross-sectional view taken along the XZ plane in a lengthwise direction of a battery cell stack in FIG. 3.
Figure 8:
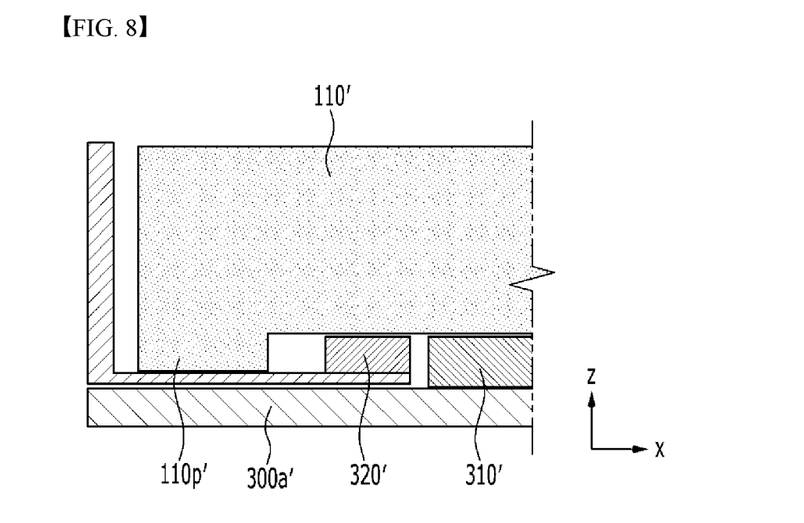
FIG. 8 is a sectional view of the battery module corresponding to a comparative example of FIG. 7.

FIG. 7 is a cross-sectional view taken along the XZ plane of a lengthwise direction of a battery cell stack in FIG. 3. FIG. 8 is a sectional view of the battery module corresponding to a comparative example of FIG. 7.

Referring to FIG. 7, the battery cell 110 according to the present embodiment includes a protrusion part 110p formed in a widthwise direction thereof and the protrusion part 110p may be located on the bending part 130b. Here, a widthwise direction of the battery cell 110 may be the Z-axis direction of FIG. 7. The lower surface 300a of the first L-shaped frame according to the present embodiment includes a first part 300a1 and a second part 300a2, the first part 300a1 is located at a periphery thereof with respect to a lengthwise direction of the battery cell 110, and the second part 300a2 is located inside the first part 300a1. Then, it is preferable that the thickness of the first part 300a1 is smaller than the thickness of the second part 300a2. Here, a lengthwise direction of the battery cell 110 may be the X-axis direction of FIG. 7.

Referring to FIGS. 6 and 7, the bending part 130b of the busbar frame 130 in the present embodiment is located on the first part of the lower surface 300a of the first L-shaped frame. Then, it is preferable that the total thickness of the thickness of the bending part 130b and the thickness of the first part 300a1 is smaller than the thickness of the second part 300a2. This is because the protrusion part 110p of the battery cell 110 is caught by steps of the first part 300a1 and the second part 300a2 to be prevented from moving due to an external impact. In addition, a gap between the battery cell 110 and a frame may be reduced through machining of the first L-shaped frame lower surface 300a, and such a gap reducing effect may cause the gap reducing effect obtained by heightwisely assembling the batter module together with a synergy effect to maximize overall space efficiency. Because the machining of the first L-shaped frame lower surface 300a progresses through press molding, thereby a step of the lower surface 300a may be formed at the same time while forming a L-shaped frame structure. The press molding, numerical control work (NC) processing, or the like may be used for forming the step.

The pad part 320 is located between the second part 300a2 and the battery cell 110, and the thermally conductive resin layer 310 is located inside the pad part 320. That is, the pad part is located between the thermally conductive resin layer 310 and the first part 300a1 of the lower surface 300a to define a location at which the thermally conductive resin layer 310 is formed.

Referring to FIG. 8, the thickness of the lower surface 300a' of the first L-shaped frame is uniform when compared with an embodiment of FIG. 7. If a battery cell 110' having the same size as the battery cell 110 described in FIG. 7, and a protrusion part 110p' are mounted on a lower surface 300a' of the first L-shaped frame, the heights of a thermally conductive resin layer 310' and a pad part 320' may become larger as there is no such step as on the lower surface 300a' of FIG. 7. Accordingly, as compared with a comparative example of FIG. 8, a tolerance between the battery cell 110 and the frame may be reduced to not only improve the space utilization but also decrease the thickness of the thermally conductive resin layer 310 so that the usage of the thermally conductive resin for forming the thermally conductive resin layer 310 may be reduced.

Hereinafter, an example of a method for manufacturing the battery module according to the above-mentioned embodiment will be described.

Figure 9:
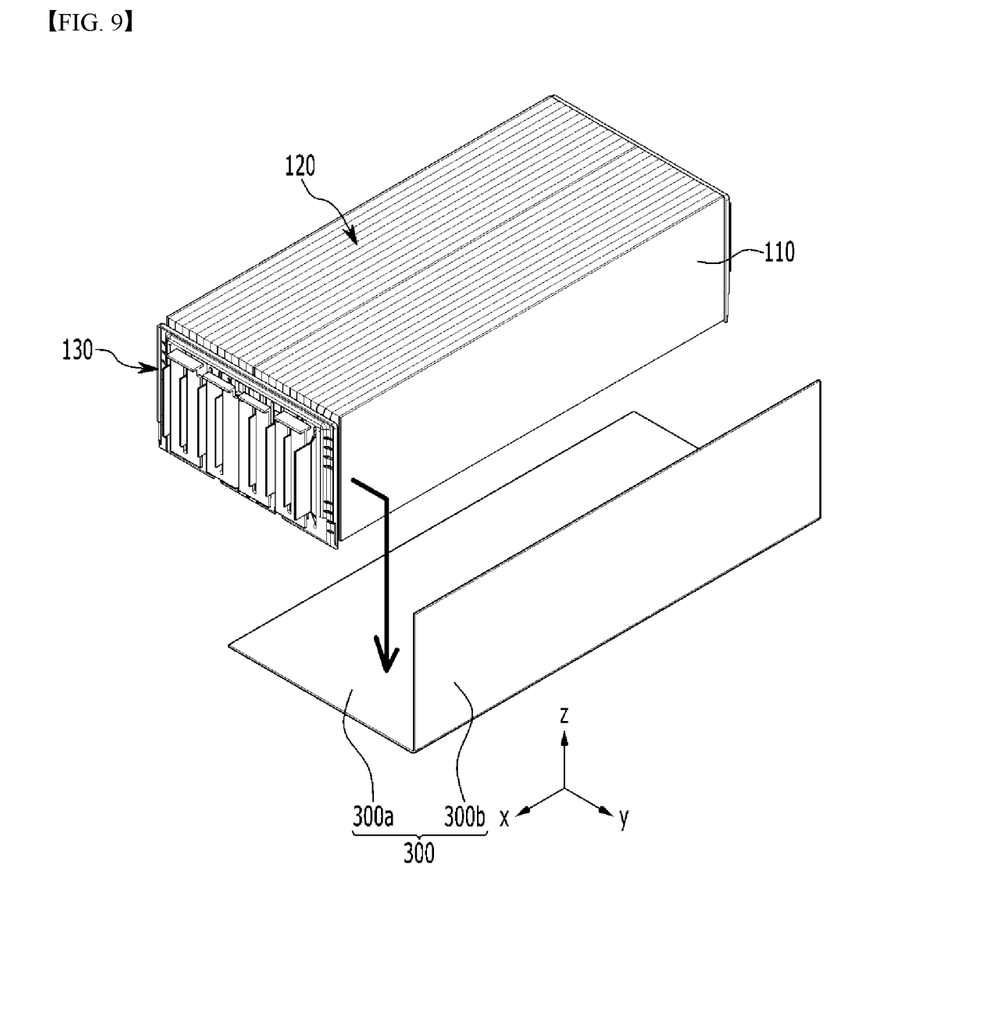
FIGS. 9 to 11 are views illustrating a method for manufacturing a battery module according to another embodiment of the present disclosure.
Figure 10:
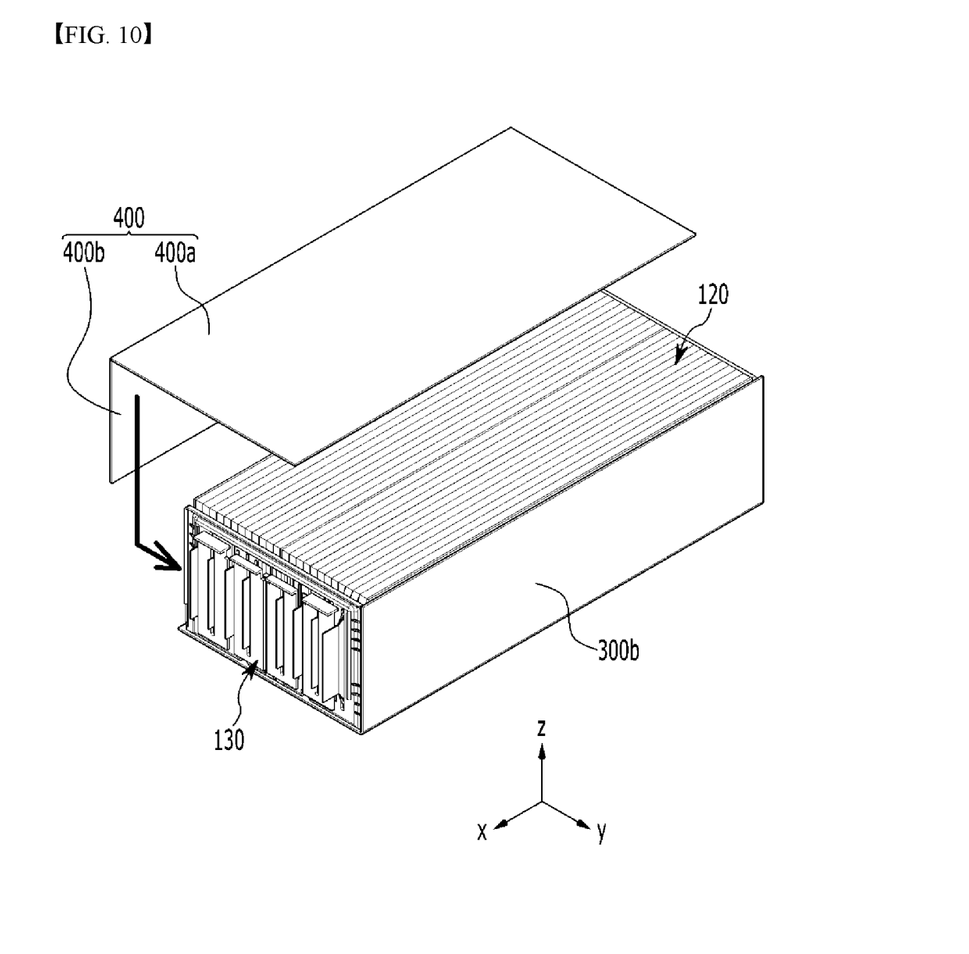
Figure 11:
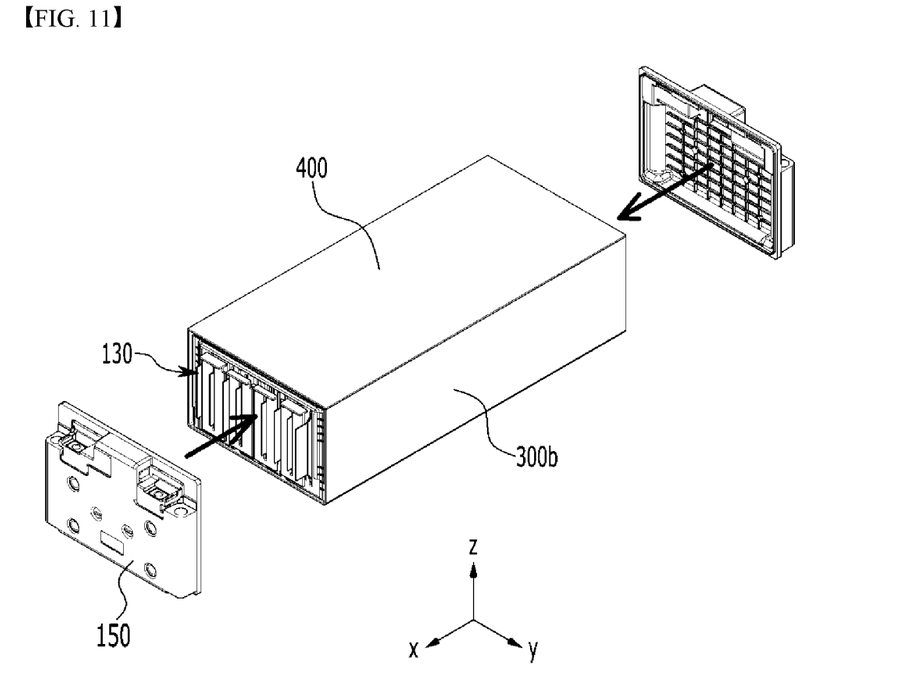

FIGS. 9 to 11 are views illustrating a method for manufacturing the battery module according to another embodiment of the present disclosure.

Referring to FIG. 9, the method for manufacturing the battery module according to the present embodiment includes stacking a battery cell stack 120 on a lower surface 300a of a first L-shaped frame 300 of which an upper part and one side surface are opened. Then, it is preferable that the battery cell stack 120 is inserted into the lower surface 300a of the first L-shaped frame 300 in a direction (the Z-axis direction) that is perpendicular to the stacking direction of the plurality of the battery cell 110 included in the battery cell stack 120. In the present embodiment, before the first L-shaped frame moves in the Z-axis direction, the battery cell stack 120 may move in the Y-axis direction along the opened one side surface of the first L-shaped frame. That is, the battery cell stack 120 may be disposed on the lower surface 300a of the first L-shaped frame in the Z-axis direction after moving to the top of the lower surface 300a by a margin in a space in which one side surface of the first L-shaped frame is opened.

The method for manufacturing the battery module according to the present embodiment may further include connecting the battery cell stack 120 and the busbar frame 130 while moving the busbar frame 130 toward an opposite direction to a direction in which an electrode lead of a battery cell 110 included in the battery cell stack 120 protrudes before mounting the battery cell stack 120 on the lower surface 300a of the first L-shaped frame 300. In addition, the method for manufacturing the battery module may further include applying a thermally conductive resin on the lower surface 300a of the first L-shaped frame 300 before the battery cell stack 120 is mounted on the lower surface 300a of the first L-shaped frame 300. The method may further include forming the pad part 320 described in FIG. 5 on the lower surface 300a of the first L-shaped frame 300 before applying the thermally conductive resin. Referring to FIGS. 5 and 9, the thermally conductive resin may be applied between the pad parts 320 not only to allow the pad part 320 to guide the application location of the thermally conductive resin, but also to prevent the thermally conductive resin from overflowing and easily control the application amount of the thermally conductive resin.

Meanwhile, the thermally conductive resin layer for transferring heat and fixing a battery cell stack may be formed between the lower of the battery cell stack 12 and the mono frame 20 as described in FIG. 1. Generally, after the battery cell stack 12 is inserted into the mono frame 20, the thermally conductive resin is inserted through an injection hole formed in the mono frame 20 to form the thermally conductive resin layer. However, in the injection method, because of a tolerance of components of each battery module, it is difficult to inject the thermally conductive resin quantitatively and there is a limit in forming the thermally conductive resin layer having a uniform thickness.

Referring to FIG. 10, the method for manufacturing the battery module according to the present embodiment includes covering the battery cell stack 120 with the second L-shaped frame 400 so as to cover an opened surface of the battery cell stack 120 that is not covered with the first L-shaped frame 300. In the present embodiment, because the second L-shaped frame 400 is coupled to the first L-shaped frame 300 in the Z-axis direction through welding and the like, a protective cover (not illustrated) that is necessary for protecting a battery cell 11 in the process of inserting the mono frame 20 of FIG. 1 into the battery cell stack 12 may be omitted. In detail, the lower surface of the first L-shaped frame 300 and the side surface part 400b of the second L-shaped frame may be welded to each other, and the side surface part 300b of the first L-shaped frame 300 and the upper surface 400a may be welded to each other.

Referring to FIG. 11, the method for manufacturing the battery module according to the present embodiment includes coupling the second L-shaped frame 400 and the first L-shaped frame 300, and coupling each end plate 150 to the opened both sides of the battery cell stack 120 surrounded by the first L-shaped frame 300 and the second L-shaped frame 400. The lower surface 300a of the first L-shaped frame 300 and the side surface part 400b of the second L-shaped frame are coupled to each other, and methods such as welding, bonding using an adhesive, bolting, riveting, taping, and the like may be used to couple the side surface part 300b of the first L-shaped frame 300 and the upper surface 400a of the second L-shaped frame 400.

Meanwhile, one or more battery modules according to an embodiment of the present disclosure can be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110p: protrusion part
130a: main frame
130b: bending part
150: end plate
300: first L-shaped frame
400: second L-shaped frame

The invention claimed is:

1. A battery module comprising:
a battery cell stack in which a plurality of battery cells are stacked,
a busbar frame that is connected to the battery cell stack,
a first L-shaped frame accommodating the battery cell stack, the first L-shaped frame defining an open upper part and one open side surface, and
a second L-shaped frame accommodating the battery cell stack, the second L-shaped frame defining an open lower part and one open side surface,
wherein the first L-shaped frame and the second L-shaped frame are engaged with each other to surround four surfaces of the battery cell stack, a lower surface of the first L-shaped frame includes a first part and a second part, the first part is located at an end with respect to a length direction of the battery cell, the second part is located between the first part and a second end opposite the first end, and wherein a thickness of the first part is smaller than the thickness of the second part,
wherein the busbar frame comprises a main frame disposed perpendicular to a direction in which electrode leads of the battery cells protrude, and a bending part extending from a lower part of the main frame, and
wherein the bending part is disposed on the first part of the lower surface of the first L-shaped frame.

2. The battery module of claim 1,
wherein the first L-shaped frame is open at opposite ends facing each other in the direction in which the electrode leads protrude, and
wherein the busbar frame is connected to the battery cell stack at both of the opposite ends of the first L-shaped frame.

3. The battery module of claim 1, wherein a total thickness of the thickness of the bending part and the thickness of the first part is smaller than that of the second part.

4. The battery module of claim 3, wherein the battery cell comprises a protrusion part formed in a width direction thereof and the protrusion part is located on the bending part.

5. The battery module of claim 1, further comprising:
a pad part located between the second part and the battery cell stack in a height direction of the battery cell.

6. The battery module of claim 5, further comprising:
a thermally conductive resin layer located between the second part and the battery cell stack in the height direction, wherein the pad part is located between the thermally conductive resin layer and the first part in the length direction.

7. The battery module of claim 1, wherein the lower surface of the battery cell stack that is perpendicular to a stack direction of the plurality of the battery cell is mounted on the lower surface of the first L-shaped frame.

8. The battery module of claim 1, further comprising:
an end plate coupled to each of the first and second ends of the first L-shaped frame.

9. A battery pack comprising the battery module of claim 1.

* * * * *